United States Patent [19]
Yanagihara et al.

[11] 3,973,437
[45] Aug. 10, 1976

[54] SYSTEM FOR METERING LIQUID

[75] Inventors: Kazuhiko Yanagihara; Hideo Takeda, both of Minami-ashigara, Japan

[73] Assignee: Fuji Photo Film Co., Ltd., Japan

[22] Filed: July 10, 1974

[21] Appl. No.: 487,179

[30] Foreign Application Priority Data
July 11, 1973   Japan.................... 48-78072

[52] U.S. Cl.................................. 73/219; 73/301
[51] Int. Cl.² ...................... G01F 3/36; G01F 23/18
[58] Field of Search............. 73/4 R, 219, 220, 299, 73/301, 426, 427, 290 R, 438; 137/12, 391; 128/2 F

[56]   References Cited
   UNITED STATES PATENTS

| | | | |
|---|---|---|---|
| 3,023,619 | 3/1962 | Sandford | 73/299 |
| 3,145,565 | 8/1964 | Smith et al. | 73/220 X |
| 3,250,123 | 5/1966 | Clayton | 73/301 |
| 3,369,394 | 2/1968 | Higgs | 73/219 X |
| 3,394,590 | 7/1968 | Napolitano | 73/4 R X |
| 3,490,290 | 1/1970 | Bilson | 73/427 |
| 3,610,042 | 10/1971 | Brosius, Jr. | 73/299 |

*Primary Examiner*—Jerry W. Myracle
*Assistant Examiner*—John S. Appleman
*Attorney, Agent, or Firm*—Fleit & Jacobson

[57]   ABSTRACT

A measuring cylinder into which liquid is supplied is provided with pressure transmitters for sensing the liquid pressure corresponding to the amount thereof. The pressure transmitters are connected with a pressure transformer to transform the pressure into an electric signal for controlling valves to stop and start the supply of liquid into the cylinder. The pressure transmitters are located in the cylinder at different levels and switched to be selectively operated in combination with the pressure transformer. In a preferred embodiment of the invention, the shape of the cylinder is designed so that the diameter thereof increases discretely from the lower part to the upper part thereof. One of the pressure transmitters is located at the bottom of the cylinder and the others are located at levels substantially the same as those at which the diameter of the cylinder increases.

9 Claims, 3 Drawing Figures

SYSTEM FOR METERING LIQUID

BACKGROUND OF THE INVENTION

1. Field of the Invention

This invention relates to a liquid measuring system, and more particularly to a system for repeatedly measuring a selectively fixed amount of liquid. The system for measuring liquid in accordance with this invention is particularly directed to an apparatus for measurement of liquid in which a predetermined amount of liquid is measured by use of a liquid level measuring device comprising a combination of pressure transmitters provided at different levels.

2. Description of the Prior Art

Conventionally, a variety of liquid measuring devices or apparatus as of the float-type, electrical-probe-type, weight-transformer-type and pressure-gauge-type have been used for industrial measurement of liquid. In these types of measuring devices, the level or amount of liquid is measured by use of a liquid level or liquid amount sensing element which is provided in a measuring cylinder and the supply of liquid into the cylinder is stopped by the signal from the sensing element.

The float-type liquid measuring device employs a float with a magnet and a magnetically operable switch provided in the measuring cylinder. When the level of the liquid supplied into the cylinder increases and the float floating on the liquid comes up to a predetermined level, the switch is closed by the magnetic force of the magnet in the float. The supply of liquid into the cylinder is then stopped in response to the closure of the switch. Thus, a predetermined amount of liquid is measured. In this type of liquid measuring device, however, there is a disadvantage in that the position or level of the magnetically operable switch must be changed when the amount of liquid to be measured is to be changed. That is to say, the measuring device of this type requires a movable part and is therefore difficult to design and maintain.

The electrical-probe-type liquid measuring device is particularly used for measuring liquid having electric conductivity. This type of measuring device usually consists of one or two electrodes extending into a cylinder for the purpose of starting and stopping pumps and operating solenoid valves or other types of equipment to control the supply of liquid into the cylinder. When the liquid level comes up to the position of the electrodes which are located at a predetermined level, a solenoid valve which is electrically connected with the electrodes is energized to stop the supply of liquid into the cylinder. Thus, a predetermined amount of liquid is measured. This type of liquid measuring device, however, also suffers from the same defects as those inherent in the foregoing float-type liquid measuring device because of the necessity to change the position of the electrodes when changing the amount of liquid to be measured.

The weight-transformer-type liquid measuring device employs a weight transformer which transforms weight to an electrical value. The total weight of the cylinder and liquid contained therein is measured by the weight transformer. When the total weight reaches a predetermined value, the supply of liquid into the cylinder is stopped. Thus, a predetermined amount of liquid is measured. This type of liquid measuring device suffers from the defect that the range of measurement is reduced by the weight of the cylinder which is measured together with the liquid.

The pressure-gauge-type liquid measuring device employs a strain-gauge-type pressure gauge disposed on the bottom of the cylinder to measure the liquid pressure at the bottom of the cylinder. On the basis of the relationship between the amount of liquid in the cylinder and the liquid pressure at the bottom of the cylinder, the predetermined amount of liquid to be measured can be represented by a predetermined value of liquid pressure measured at the bottom of the cylinder. Therefore, by stopping the supply of liquid into the cylinder when the liquid pressure measured at the bottom of the cylinder reaches said predetermined value, a predetermined amount of liquid is measured. This type of liquid measuring device suffers from the following defect. It is known that the absolute error produced in a strain-gauge-type pressure gauge of a fixed full scale is always constant. Therefore, the relative error increases as the amount of liquid to be measured decreases. Accordingly, the range of measurement is reduced. In other words, in this type of liquid measuring device, it is impossible in the practical sense to measure amounts of liquid which are small with respect to the full scale of the pressure gauge used therein. In order to use this type of liquid measuring device to measure such small amounts of liquid, a pressure gauge of small full scale must be prepared separately.

SUMMARY OF THE INVENTION

In the light of foregoing observations and description of the prior arts, the primary object of the present invention is to provide a system for measuring liquid which permits highly accurate measurement of amounts of liquid ranging from small to large.

Another object of the present invention is to provide a system for measuring liquid by use of pressure gauges which permits highly accurate measurement of amounts of liquid ranging from small to large.

Still another object of the present invention is to provide a system for measuring liquid which is particularly able to measure a small amount of liquid with high accuracy.

A further object of the present invention is to provide a system for measuring liquid which is particularly able to measure a large amount of liquid with a measuring cylinder of comparatively small size.

A still further object of the present invention is to provide a system for measuring liquid in which the amount of liquid measured thereby can easily be changed by controlling electrical means used therein.

A still further object of the present invention is to provide a system for measuring liquid which can be manufactured at a low cost in which a number of pressure transmitters are connected with a single pressure transformer and an operating circuit.

The liquid measuring system in accordance with the present invention employs a plurality of pressure transmitters one of which is located at the bottom of a measuring cylinder and the other of which is located at different levels above the bottom thereof in the cylinder. Preferably, one pressure transformer is connected with the plurality of pressure transmitters by way of switching valve means so that only the one pressure transmitter which is to measure the pressure of liquid in the cylinder may be communicated with the pressure transformer. The pressure measured by the pressure transmitters is transformed into an electric signal used for controlling the supply of liquid into the measuring cylinder.

Further, the measuring cylinder used in the liquid measuring system in accordance with the present invention is preferably shaped so that the diameter thereof will increase discretely from the lower part to the upper part thereof. That is, the upper part of the measuring cylinder has a larger diameter and the lower part has a smaller diameter, with the diameter changing discretely. Owing to this shape of the cylinder in combination with the provision of the plurality of pressure transmitters, it becomes possible to perform highly accurate measurement of a small amount of liquid as well as measurement of a large amount of liquid with a measuring cylinder of comparatively small size.

In a preferred embodiment of this invention, the pressure transmitters other than the one located at the bottom of the measuring cylinder are located at levels that are slightly lower than the levels where the diameter of the measuring cylinder discretely changes.

The above and other objects, features and advantages of the present invention will be fully understood from the following detailed description of the fundamental concept of the invention and the description of the preferred embodiments thereof taken in conjunction with the accompanying drawings.

DESCRIPTION OF THE PREFERRED EMBODIMENTS

Figure 1:
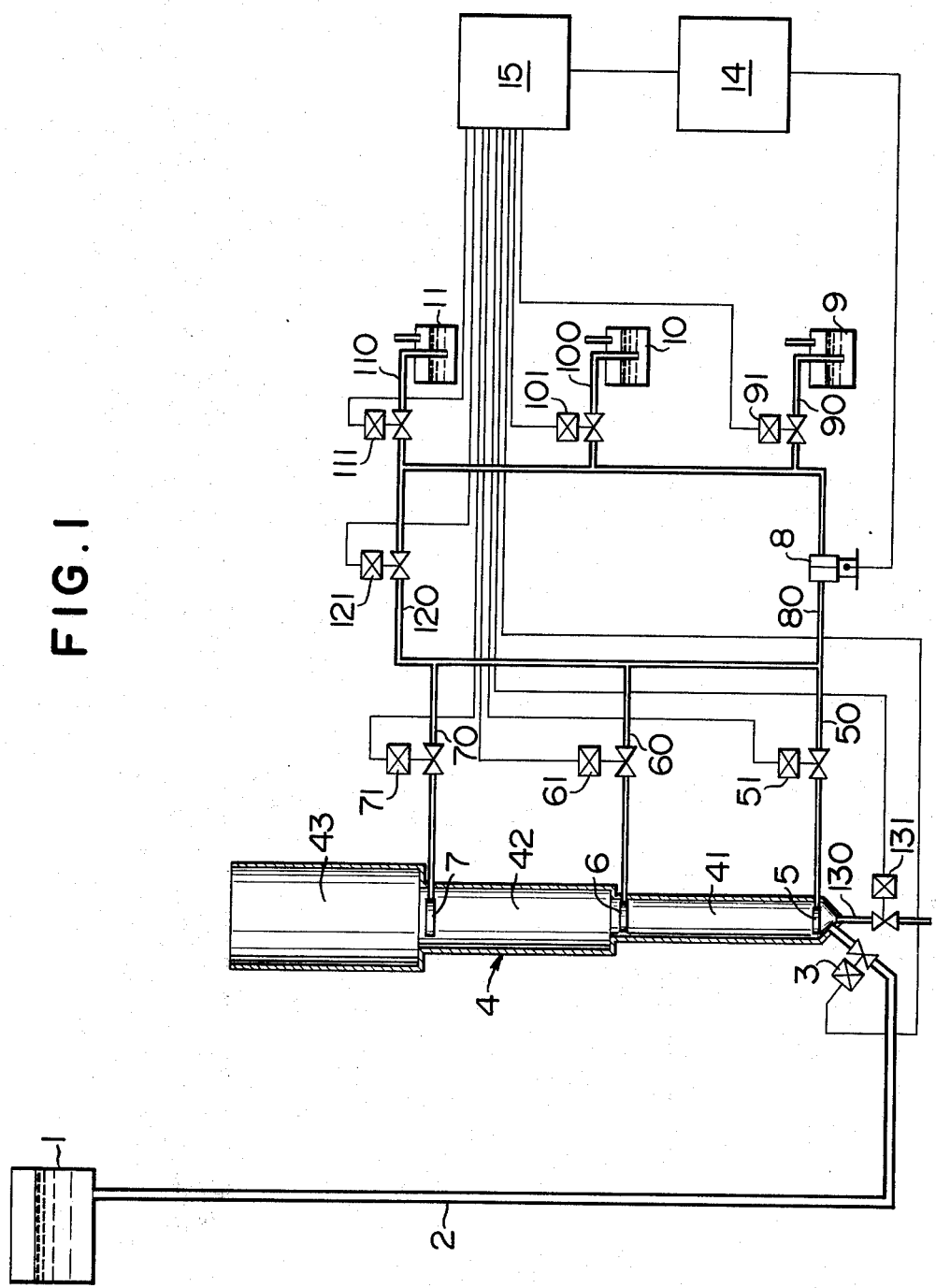
FIG. 1 is a diagramatic illustration which shows the construction of the whole system of an embodiment of the liquid measuring system in accordance with this invention.

Before describing the preferred embodiments of this invention, it will be helpful to explain the fundamental concept of this invention.

In general, the minimum depth $h_{min}[L]$ ([L] indicates the dimension of length) of the liquid which can be measured within the allowable relative error $\epsilon[-]$ ([−] indicates no dimension) can be represented by the formula, $$h_{min}\,[\,L\,] = \delta\,[L]\,/\,\epsilon$$

where $\delta[L]$ denotes the constant absolute error of a strain-gauge type pressure gauge used in the measurement of liquid depth.

Generally, in the liquid measuring device using such a strain-gauge type pressure gauge, the range wherein the depth of liquid can be measured within the allowable relative error $\epsilon$ (which will hereinbelow be referred to as a "range of measurement") is from $h_{min}$ to $(H,h)_{min}$, where H denotes the height of the measuring cylinder and $h$ denotes the height of the full scale of the strain-gauge type pressure gauge and $(H,h)_{min}$ indicates either H or $h$ whichever is smaller. Here, it is assumed that H is equal to $h$ and $(H,h)_{min}$ will hereinbelow be represented by $h$, since in practical cases H is always equal to $h$.

Now, in accordance with this invention, a first pressure transmitter (the full scale of which is $h_1[L]$) is located at the bottom of a measuring cylinder and a second pressure transmitter (the full scale of which is $h_2[L]$) is located in the cylinder above the first pressure transmitter at a level higher than the level of the first transmitter by the height of $l_1[L]$. Similarly, a third and other pressure transmitters are provided in the required number in the cylinder at such levels that the $(i+1)$th transmitter (having the full scale of $h_{i+1}[L]$) is located at a level higher than the $i$-th transmitter (having the full scale of $h_i$) by the height of $l_i[L]$, where $i=1, 2, \ldots n-1$ and $n$ denotes the necessary number of pressure transmitters provided in the measuring cylinder. The cross-sectional area of the measuring cylinder is constant between each pair of adjacent pressure transmitters, and the cross-sectional area of the cylinder between the first and second pressure transmitters is denoted by $S_1[L^2]$ ($[L^2]$ indicates the dimension of squared length) and the cross-sectional area between the $i$-th and $(i+1)$-th pressure transmitters is denoted by $S_i[L^2]$. Further, the cross-sectional area above the $n$-th (the uppermost) pressure transmitter is denoted by $S_n[L^2]$.

The range of measurement of the first pressure transmitter located at the bottom of the cylinder is from $h_{min\,1}$ to $h_1$, where $h_{min\,1}$ denotes the minimum depth of liquid which can be measured by the first pressure transmitter within the allowable relative error $\epsilon$ and can be represented by the formula, $$h_{min\,1} = \delta_1\,/\,\epsilon$$

where $\delta_1$ denotes the absolute error of the pressure gauge using the first pressure transmitter. The absolute error of the pressure gauge using the $k$-th pressure transmitter will hereinbelow be denoted by $\delta_k[L]$, where $k=1, 2, \ldots n$.

Now the range of measurement of the second pressure transmitter will be considered assuming that the height $l_1$ of the second pressure transmitter above the first is equal to the full scale $h_1$ of the first pressure transmitter. In order that measurement of the level or depth of the liquid in the measuring cylinder may be continuously performed from below to above the second pressure transmitter, the error of measurement by the pressure gauge using the second pressure transmitter must be equal to or less than the allowable relative error $\epsilon$. In order that the error of measurement may be always equal to or less than the allowable relative error $\epsilon$, the following conditions must be satisfied for all depths $h_2$ which are equal to or less than the minimum depth $h_{min\,2}$ that can be measured by the second pressure transmitter:

$$\frac{\delta_2 S_2}{h_1 S_1 + h_2 S_2} \leqq \epsilon\,,$$

that is, $$h_2 \geqq \frac{\delta_2}{\epsilon} - \frac{S_1}{S_2}h_1\,.$$

In order that the measurement can be continuously performed, the above condition must be satisfied for $h_2=0$. Therefore, the necessary and sufficient condition for continuous measurement is $$\frac{\delta_2}{\epsilon} - \frac{S_1}{S_2} h_1 \leq 0 ,$$

that is, $$S_2 \leq \frac{\epsilon}{\delta_2} h_1 S_1 .$$

The conditions to be satisfied in order that the error of measurement by the pressure gauge using the third pressure transmitter may be always equal to or less than the allowable relative error $\epsilon$ are given by the following formula similarly to the above conditions for the second pressure transmitter, if the height $l_2$ of the third pressure transmitter above the second is equal to the full scale $h_2$ of the second pressure transmitter, $$S_3 \leq \frac{\epsilon}{\delta_3} (h_1 S_1 + h_2 S_2) .$$

From the foregoing conditions for the second and third pressure transmitters, the following general conditions are deduced if the height $l_i$ of the $(i+1)$-th pressure transmitter above the $i$-th pressure transmitter is equal to the full scale $h_i$ of the $i$-th pressure transmitter, $$S_{i+1} \leq \frac{\epsilon}{\delta_{i+1}} \sum_{j=1}^{i} (h_j S_j)$$

where $i = 1, 2, \ldots n\text{-}1$.

Therefore, if the cross-sectional area of the cylinder is designed to satisfy the above conditions, it becomes possible to make the error of measurement equal to or less than the allowable relative error $\epsilon$ in the measurement of liquid of a depth not less than $h_{min\ 1}$. Thus, the range of measurement in such a liquid measuring device becomes from $h_{min\ 1}$ to $$\sum_{k=1}^{n} h_k .$$

If the measuring cylinder is designed to satisfy the foregoing conditions, the range wherein the error of measurement exceeds the allowable relative error $\epsilon$ depends only upon the first pressure transmitter provided at the bottom of the cylinder. Accordingly, in order to make the range of measurement as large as possible, the product $h_{min\ 1} \cdot S_1$ is desired to be made as small as possible. The product $h_{min\ 1} \cdot S_1$ can be reduced by reducing either $h_{min\ 1}$ or $S_1$. Since the liquid pressure sensed by the pressure transmitter is proportional to the depth of the liquid which represents the amount of liquid in the cylinder, it is desirable to make the cross-sectional area of the cylinder $S_1$ between the first and second pressure transmitters as small as possible to effect a large variation in depth with a small variation in the amount of liquid in the cylinder and enhance the accuracy in measurement thereof.

The maximum amount of liquid which can be measured by this device is represented by the formula, $$\sum_{k=1}^{n} h_k S_k [L^3] .$$

This value should be as large as possible to obtain a large range of measurement with a single measuring device. However, the height of the measuring cylinder $$\sum_{k=1}^{n} h_k$$

is normally limited by the space available for the device. Therefore, the maximum value of liquid which can be measured cannot be enlarged without enlarging the area of cross section $S_k$ of the cylinder. On the other hand, since the accuracy in measurement is lowered as the area of cross section $S_k$ increases, the area of cross section of the cylinder should be as small as possible from the viewpoint of accuracy in measurement of the liquid pressure. The inventors of the present invention have found that both the above two apparently irreconcilable requirements can be substantially satisfied by designing the shape of the cylinder so that the diameter thereof will increase discretely from the lower part to the upper part of the cylinder as $S_1 < S_2 < S_3 < \ldots < S_n$. When the shape of the cylinder is designed in such a way as mentioned above, the increase in the relative error in the measurement of liquid pressure which results from the fact that the diameter of the second part of the cylinder $S_2$ between the second and third pressure transmitters is larger than that of the first part thereof $S_1$ between the first and second pressure transmitters does not cause a serious problem since in the measurement of liquid pressure by the second pressure transmitter the liquid is measured together with the amount of liquid $h_1 S_1$ contained in the first part of the cylinder. Similarly, the increases in the relative error caused by the increases in the diameter of the third and above parts of the cylinder do not cause a serious problem either.

Thus, the proper cross-sectional area of the various parts of the measuring cylinder can be determined as follows, $$S_i < S_{i+1} \leq \frac{\epsilon}{\delta_{i+1}} \sum_{j=1}^{i} (h_j S_j)$$

where $i=1, 2, 3, \ldots n-1$.

In the discussion above, it has been assumed that the height $l_i$ of the $(i+1)$-th pressure transmitter above the $i$-th pressure transmitter is equal to the full scale $h_i$ of the $i$-th pressure transmitter. However, in the practical measurement of liquid, it is undesirable to switch the pressure transmitter from a lower to a higher one as soon as the level of liquid exceeds the level of the higher pressure transmitter. This is because practical measurement of the liquid will be very difficult when the amount of liquid over the higher level pressure transmitter is small and the area of cross section of the part of the cylinder just above the higher level pressure transmitter is large. This difficulty can be eliminated by providing the higher level pressure transmitter at a level lower than the level of the full scale of the lower pressure transmitter. In other words, the range of measurement of liquid pressure of the $i$-th pressure transmitter is partly overlapped with the range of measurement of the $(i+1)$-th pressure transmitter, and the liquid pressure of the liquid having a level up to the full scale $h_i$ of the $i$-th pressure transmitter is measured by the $i$-th pressure transmitter and the liquid pressure of the liquid having a level over said full scale $h_1$ is measured by the $(i+1)$-th pressure transmitter. In this case, the range of measurement of the liquid measuring device becomes from $h_{min\ 1}$ to $$\sum_{k=1}^{n} l_k .$$

The range of measurement of the liquid measuring device in accordance with the present invention as defined above is larger than that of the conventional liquid measuring device. This is explained as follows. In case where the cross-sectional area $(S)$ of the measuring cylinder used in this invention is constant from top to bottom and is equal to that of the cylinder used in the conventional measuring device and it is assumed that the maximum amount of liquid which can be measured in the two devices is the same, the height of the two cylinders must be the same. The height of the cylinder $h[L]$ of the conventional liquid measuring device is, therefore, equal to the height of the cylinder of the measuring device of this invention represented by $$\sum_{k=1}^{n} h_k .$$

On the other hand, the minimum amount of liquid which can be measured by the measuring device of this invention is $h_{min\ 1}$. $S = S\delta_1/\epsilon$, and that measured by the conventional measuring device is $S\delta/\epsilon$. The larger the full scale of the pressure transmitter is, the larger the absolute error $\delta$ thereof becomes. Therefore, if more than one pressure transmitter is used and accordingly the height $h$ of the cylinder of the conventional measuring device is larger than the height $h_1$ of the first part of the cylinder of the measuring device of this invention, the full scale of the pressure transmitter used in the conventional device $h$ is larger that that of the first transmitter used in the device of this invention $h_1$ and accordingly the minimum amount of liquid that can be measured by the conventional measuring device $S\delta/\epsilon$ is larger than that which can be measured by the device of this invention $S\delta_1/\epsilon$. Therefore, the range of measurement of the liquid measuring device in accordance with this invention is larger than that of the conventional measuring device.

When the diameter of the measuring cylinder is different at different parts of the cylinder of the measuring device in accordance with this invention as described above, there is a possibility that the full scale $h_1$ of the first pressure transmitter may be larger than the height of the cylinder $h$ of the conventional type of the measuring device. However, this is only possible if the diameter of the first part of the cylinder of this invention is very small and the diameter of the cylinder of the conventional device is extremely large. In such a case, therefore, the minimum amount of liquid which can be measured by the measuring device of this invention (that is measured by the first cylinder part of very small diameter) must be smaller than that of the conventional device (that is measured by the cylinder of very large diameter). Thus, it can be said that the range of measurement of the liquid measuring device of this invention is always larger than that of the conventional liquid measuring device.

Further, it should be noted that if the measuring cylinder of the conventional liquid measuring device is designed to have different diameters at different parts thereof, the relationship between the liquid pressure and the amount of liquid must be obtained in advance. Therefore, from this point of view also, the liquid measuring device in accordance with the present invention is superior to the conventional device.

Now the present invention will be described in detail with reference to particular embodiments thereof taken in conjunction with the accompanying drawings. The construction of the whole system of an embodiment of this invention is illustrated in FIG. 1. The liquid to be measured is stored in a storage tank 1 which is communicated with the bottom of a measuring cylinder 4 throgh a liquid supply pipe 2. The liquid supply pipe 2 is provided with a supply control valve 3 to control the supply of the liquid into the measuring cylinder 4. The measuring cylinder 4 consists of three cylinder parts 41, 42 and 43 which are different in diameter. The first part I which is the lowermost part is the smallest in diameter, the second part II or the intermediate part is larger in diameter than the first part I, and the third part III or the uppermost part is the largest in diameter. Three pressure transmitters 5, 6 and 7 are provided at the bottom of the cylinder 4, at the level between the first and second parts of the cylinder and at the level between the second and third parts of the cylinder, respectively. More specifically, the pressure transmitters 5, 6 and 7 are located at levels slightly below the levels where the diameter of the cylinder 4 changes as shown in FIG. 1. When the level of liquid is in the first part 41 of the cylinder 4, the liquid pressure is measured by the first pressure transmitter 5 located at the bottom of the cylinder. When the level of liquid is in the second part 42 of the cylinder 4, the liquid pressure is measured by the second pressure transmitter 6. Similarly, when the level of liquid is in the third part 43, the third pressure transmitter 7 is used.

The three pressure transmitters 5, 6 and 7 are connected with a pressure transformer 8 through three liquid-filled capillaries 50, 60 and 70 which are directly communicated with the pressure transmitters 5, 6 and 7, respectively, and through a single liquid conduit 80 communicated with the pressure transformer 8. The liquid in the capillaries 50, 60 and 70 is incompressible and has a small coefficient of thermal expansion. The capillaries 50, 60 and 70 are provided with electromagnetic valves 51, 61 and 71, respectively, to selectively make one of the pressure transmitters communicate with the pressure transformer 8. The pressure transmitters 5, 6 and 7 are further connected with liquid chambers 9, 10 and 11 through said capillaries 50, 60 and 70 and three other capillaries 90, 100 and 110 which are directly communicated with the liquid chambers 9, 10 and 11, respectively, by way of a single liquid conduit 120 which is provided with an electromagnetic valve 121. The liquid chambers 9, 10 and 11 are located at levels substantially equal to the levels of the pressure transmitters 5, 6 and 7, respectively, to make a pressure balance for zero adjustment. In greater detail, the liquid in the capillary 50 of the first pressure transmitter 5 is subject to the pressure corresponding to the different in level between the liquid level in the liquid chamber 9 and the level of the first pressure transmitter 5. This pressure is required to be positive so that the pressure sensing diaphragm in the pressure transmitter 5 may always be tensioned. Therefore, the level of the liquid in the liquid chamber 9 is set to be slightly higher than the level of the pressure transmitter 5. Similarly, the levels of liquid in the liquid chambers 10 and 11 are designed to be slightly higher than those of the pressure transmitters 6 and 7, respectively. The capillaries 90, 100 and 110 which are communicated with said capillaries 50, 60 and 70 by way of said single liquid conduit 120 are also communicated with said pressure transformer 8 through said liquid conduit 80. Thus, the capillaries 50, 60 and 70 communicated with the pressure transmitters 5, 6 and 7 are connected with the capillaries 90, 100 and 110 communicated with the liqiud chambers 9, 10 and 11 by way of two parallel liquid conduits 80 and 120, one of which is provided with a pressure transformer 8 and the other with a valve 121. The valve 121 is opened only when the zero-adjustment of the pressure transformer 8 is conducted, and is accordingly closed when the liquid is measured by the pressure transmitters and the pressure transformer 8. The capillaries 90, 100 and 110 are provided with electromagnetic valves 91, 101 and 111, respectively, to selectively make one of the liquid chambers communicate with the conduits 80 and 120. At the bottom of the measuring cylinder 4 is connected an exhaust pipe 130 which is provided with an electromagnetic valve 131. When the liquid is measured and the supply of liquid into the cylinder 4 is stopped, the valve 131 is opened and the liquid measured is exhausted from the cylinder through the exhaust pipe 130.

The pressure transformer 8 is electrically connected with a liquid amount setting and indicating means 14 which is operated to set the amount of liquid to be measured and indicates the amount of liquid being measured in the cylinder 4. The liquid amount setting and indicating means 14 is electrically connected with a sequence control means 15 which controls said electromagnetic valves 51, 61, 71, 91, 101, 111, 121 and 131.

Now, the operation of the above described system for measuring liquid in accordance with an embodiment of the present invention will be described. At the first stage when the measurement of liquid is started, all the electromagnetic valves are in the closed position. When the measurement of liquid is to be conducted in the first part 41 of the measuring cylinder 4 using the first pressure transmitter 5, the valves 51, 121 and 91 are opened to make the pressure on the both sides of the pressure transformer 8 equal to perform zero adjustment of the pressure transformer 8.

When the pressure is balanced on both sides of the pressure transformer 8 and the zero adjustment thereof is completed, the valve 121 in the liquid conduit 120 is closed. Then, the liquid supply control valve 3 is opened to supply liquid into the measuring cylinder 4. The amount of liquid increasing in the first part 41 of the cylinder 4 is sensed by the pressure transmitter 5 and indicated in the indicating means 14 through the pressure transformer 8. When the liquid in the cylinder 4 reaches the predetermined amount to be measured, the supply control valve 3 is closed and the exhaust valve 131 is opened by the control means 15 to exhaust the liquid in the cylinder 4 through the exhaust pipe 130. When the liquid is completely exhausted, the valves 51, 91 and 131 are closed. Thus, one cycle of the operation of the above described system is finished. The sequential operation of the electromagnetic valves is controlled by said sequence control means 15.

When the measurement of liquid is to be conducted in the second part 42 of the measuring cylinder 4, the same operations as described above relative to valves 51 and 91 in the operation of the system when the liquid measurement is conducted in the first part 41 of the cylinder 4 are performed by the valves 61 and 101, respectively. Operations of the other elements are all the same as those described hereinabove. Similarly, when the measurement of liquid is to be conducted in the third part 43 of the measuring cylinder 4, valves 71 and 111 are operated instead of the valves 51 and 91. Thus, in whichever part of the cylinder 4 the level of liquid may be, the measurement of liquid can be conducted with high accuracy.

The pressure measuring system employed in the above described embodiment of the invention is of the differential pressure measuring type in which a relative liquid pressure is measured and transformed. This measuring system is advantageous in comparison with the absolute liquid pressure measuring system in that there is no need to compensate for the influence of atmospheric pressure. In case where the absolute liquid pressure is to be measured, two pressure transformers must be used for measuring the atmospheric pressure as well as the absolute liquid pressure.

Figure 2:
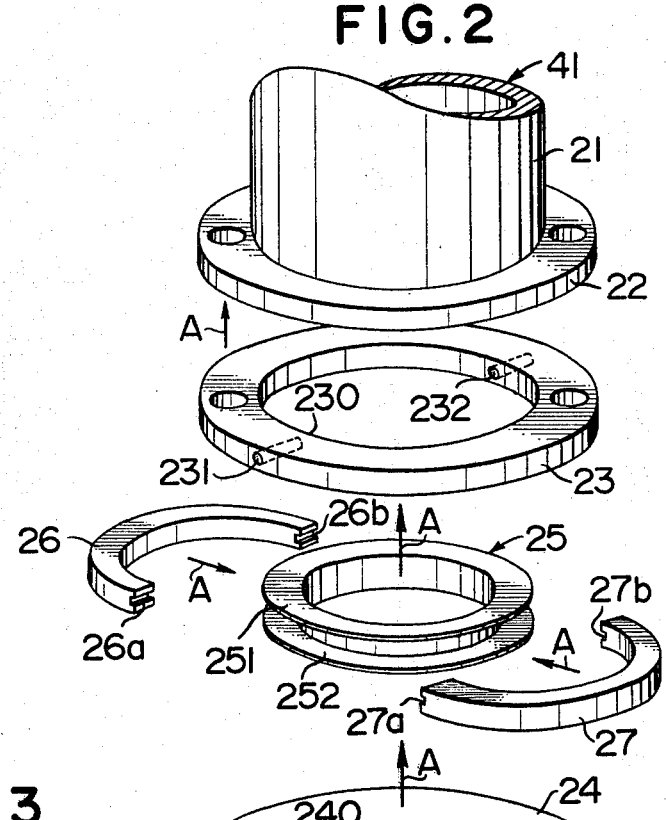
FIG. 2 is an exploded perspective view showing the structure of the pressure transmitter employed in an embodiment of the liquid measuring system in accordance with this invention.

The detailed construction of the pressure transmitter used in the above embodiment of the invention is illustrated in FIG. 2. The pressure transmitter illustrated in FIG. 2 is the first pressure transmitter 5 located at the bottom of the cylinder 4. The first part 41 of the cylinder 4 is provided at the lower end of the cylinder wall 21 thereof with an upper flange 22. A center flange 23 of substantially the same diameter as that of the upper flange 22 having an opening 230 and a lower flange 24 also of substantially the same diameter are mounted to the upper flange 22 in this order as shown in FIG. 2. The lower flange 24 is provided with a recess 240 communicated with said exhaust pipe 130 and said supply pipe 2. The center flange 23 is interposed between the upper flange 22 and the lower flange 24 in contact therewith and fixed thereto by means of bolts or the like. In the opening 230 of the center flange 23 is disposed an annular pressure sensing diaphragm 25 having upper and lower brims 251 and 252 supported between a pair of semicircular spacers 26 and 27. The pressure sensing diaphragm 25 is made of chemically resistant thin flexible membrane having a thickness of $25\mu$ or less. The semicircular spacers 26 and 27 are joined together to form a ring around the diaphragm 25, and put in said opening 230 together with the diaphragm 25. The ends of the semicircular spacers 26 and 27 are provided with radial grooves 26a and 26b and radial grooves 27a and 27b, respectively, to form radially extending liquid passages between the ends of the spacers 26 and 27 when the spacers 26 and 27 are joined together. The center flange 23 is provided with a pair of radially extending liquid holes 231 and 232 aligned on a diameter thereof. When assembling the spacers 26 and 27 together in the space in the openging 230 of the center spacer 23, the liquid passages formed between the spacers 26 and 27 with the grooves 26a and 27a and the grooves 26b and 27b are aligned with the liquid holes 231 and 232, respectively. The liquid in the capillary 50 transmits the pressure sensed by the sensing diaphragm 25 to the pressure transformer 8 through these liquid passages formed with the grooves 26a and 27a and the grooves 26b and 27b and holes 231 and 232. Arrows A shown in FIG. 2 indicate the directions of assembling of elements illustrated.

Although but one embodiment of the present invention has been described and illustrated hereinabove, it will be apparent to those skilled in the art that various variations and modifications may made therein without departing from the spirit of the invention. For example, although in the above described embodiment the measuring cylinder has three parts of different diameter, the parts of different diameter need not necessarily be three in number but may be of any number if more than one.

Figure 3:
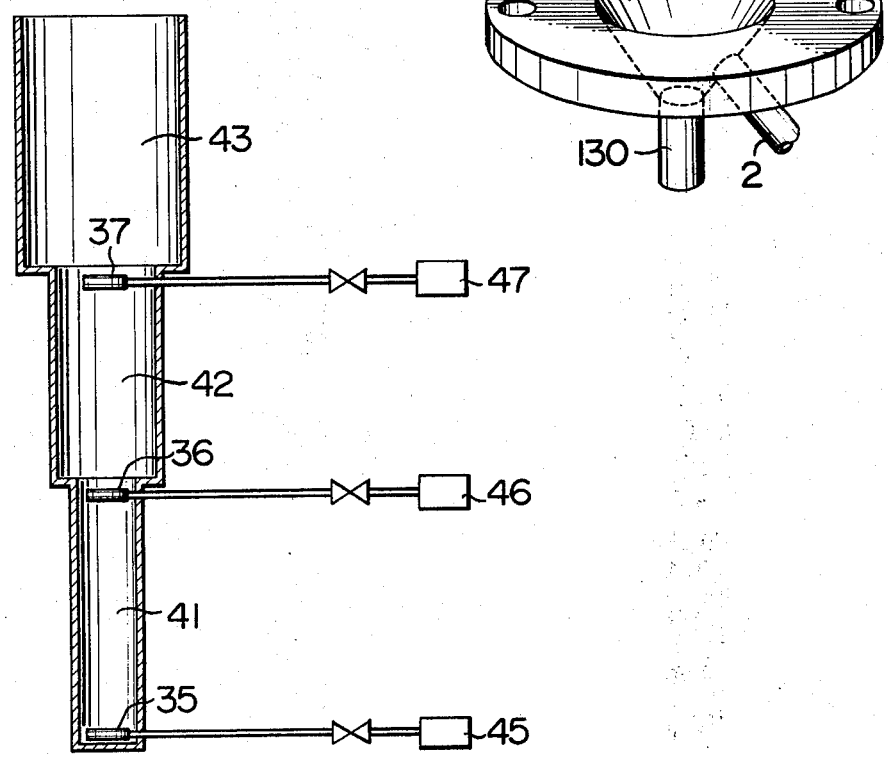
FIG. 3 is a diagramatic side view showing a variation in the arrangement of the pressure transformers employed in connection with the measuring cylinder in an embodiment of this invention.

Further, although only one pressure transformer 8 is used in the above described embodiment, two or more pressure transformers can of course be used. For example, as shown in FIG. 3, three pressure transformers 45, 46 and 47 may be used in combination with three pressure transmitters 35, 36 and 37 corresponding to said first, second and third pressure transmitters 5, 6 and 7 as shown in FIG. 1. If there should be great difficulties in designing a measuring cylinder having discretely increasing diameter, the diameter of the cylinder may be made constant from top to bottom. In such a case, however, the range of measurement cannot be made so large as that of the device with the cylinder having changing diameter.

It will be understood that the pressure transformer 8 used in the above described embodiment for transforming pressure into an electric output signal may be of any type. For example, a strain-gauge type pressure transformer or a differential transformer can be used for this purpose.

We claim:

1. A system for measuring liquid level wherein a predetermined amount of liquid is repeatedly measured comprising in combination:

a measuring cylinder into which liquid is supplied for measurement and from which measured liquid is exhausted, wherein the diameter of said measuring cylinder increases discretely from the lower part to the upper part thereof, to define a plurality of measuring sections in fluid communication with each other so that liquid can pass freely among the plurality of measuring sections, electromagnetically operated valve means provided in liquid supply and exhaust pipes communicated with said measuring cylinder, a plurality of pressure transmitters located in the measuring cylinder at different levels, each pressure transmitter being associated with one section of the plurality of sections and measuring the pressure of the liquid above said pressure transmitter, one of the pressure transmitters being located at the bottom of the measuring cylinder, pressure transformer means connected with said pressure transmitters for transforming pressure into an electric output signal, control means connected with said pressure transformer means for controlling said valve means according to the electric output signal transmitted from the pressure transformer, and switching means connected to said pressure transmitters for selectively making one of the pressure transmitters communicate with the pressure transformer means so that only the pressure transmitter located immediately below the level of liquid to be measured in the cylinder may transmit the pressure sensed thereby to the pressure transformer means.

2. A liquid measuring system as defined in claim 1 wherein said pressure transmitters other than the one located at the bottom of the cylinder are located substantially at levels where the diameter of the cylinder changes.

3. A liquid measuring system as defined in claim 1 wherein said pressure transmitters other than the one located at the bottom of the cylinder are located at levels slightly lower than the levels where the diameter of the cylinder changes.

4. A liquid measuring system as defined in claim 1 wherein a single pressure transformer is connected with said pressure transmitters through a liquid-filled conduit means by way of said switching means.

5. A liquid measuring system as defined in claim 4 wherein said switching means comprises electromagnetically operated valve means provided in said conduit means and operated to selectively make one of the pressure transmitters communicate with the pressure transformer.

6. A liquid measuring system as defined in claim 5 wherein said valve means provided in the conduit means between the pressure transmitters and the pressure transformer is operated by said control means connected with said pressure transformer.

7. A liquid measuring system as defined in claim 1 wherein the same number of pressure transformers as that of said pressure transmitters are connected with the pressure transmitters, respectively.

8. A liquid measuring system as defined in claim 1 wherein liquid chambers of the same number as that of the pressure transmitters are located at substantially the same levels as those of the pressure transmitters and connected with said pressure transmitters and said pressure transformer for performing zero adjustment of the pressure transformer.

9. A liquid measuring system as defined in claim 8 wherein the levels of liquid in said liquid chambers are set to be slightly higher than the levels of the pressure transmitters corresponding thereto so that the liquid in the liquid conduit means between the pressure transmitters and the liquid chambers is subject to positive pressure.

* * * * *